United States Patent
Otsuka et al.

(10) Patent No.: US 8,959,995 B2
(45) Date of Patent: Feb. 24, 2015

(54) THERMAL FLOW SENSOR HAVING A POWER SOURCE FOR DRIVING A BRIDGE CIRCUIT AND AN INTEGRATED CIRCUIT

(75) Inventors: Kazuhiko Otsuka, Chiyoda-ku (JP); Shinichiro Hidaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 446 days.

(21) Appl. No.: 13/349,949

(22) Filed: Jan. 13, 2012

(65) Prior Publication Data
US 2013/0068014 A1 Mar. 21, 2013

(30) Foreign Application Priority Data
Sep. 16, 2011 (JP) ................. 2011-202880

(51) Int. Cl.
G01F 1/68 (2006.01)
G01F 1/696 (2006.01)
G01F 1/698 (2006.01)

(52) U.S. Cl.
CPC ............... *G01F 1/696* (2013.01); *G01F 1/698* (2013.01)
USPC ...................................... 73/204.25

(58) Field of Classification Search
None
See application file for complete search history.

(56) References Cited

U.S. PATENT DOCUMENTS

| | | | | |
|---|---|---|---|---|
| 2,650,496 A | * | 9/1953 | Middleton et al. | 73/204.15 |
| 4,416,241 A | * | 11/1983 | Knapp et al. | 73/114.34 |
| 4,841,938 A | * | 6/1989 | Weibler et al. | 73/204.21 |
| 4,860,583 A | * | 8/1989 | Olson | 73/204.15 |
| 6,769,298 B2 | * | 8/2004 | Matsumura et al. | 73/204.15 |
| 7,200,486 B2 | * | 4/2007 | Tanaka et al. | 73/114.16 |
| 2005/0229694 A1 | | 10/2005 | Matsumoto et al. | |
| 2006/0070436 A1 | | 4/2006 | Matsumoto et al. | |

FOREIGN PATENT DOCUMENTS

| | | |
|---|---|---|
| JP | 05-203475 A | 8/1993 |
| JP | 2000-314645 A | 11/2000 |
| JP | 2005-283381 A | 10/2005 |

OTHER PUBLICATIONS

Japanese Office Action (Notification of Reason for Refusal) issued Sep. 3, 2013, Patent Application No. 2011-202880.
Japanese Office Action, dated Jul. 1, 2014, issued in counterpart Japanese Patent Application No. 2011-202880.

* cited by examiner

*Primary Examiner* — Harshad R Patel
(74) *Attorney, Agent, or Firm* — Sughrue Mion, PLLC; Richard C. Turner

(57) ABSTRACT

A thermal flow sensor for vehicles includes a bridge circuit unit having a heating resistor whose resistance value changes according to temperature, a resistance thermometer, detecting a temperature of a fluid, whose resistance value changes according to temperature, and an integrated circuit unit controlling the bridge circuit unit and outputting a signal of detected fluid flow rate. A drive power source for the bridge circuit unit is supplied from a battery, and a drive power source for the integrated circuit unit is supplied from a constant voltage source stabilized by a fuel injection control device.

7 Claims, 2 Drawing Sheets

THERMAL FLOW SENSOR HAVING A POWER SOURCE FOR DRIVING A BRIDGE CIRCUIT AND AN INTEGRATED CIRCUIT

BACKGROUND OF THE INVENTION

1. Field of the Invention

This invention relates to a thermal flow sensor for vehicles, and to a power source thereof for driving a bridge circuit unit and an integrated circuit (IC) unit for controlling the bridge circuit unit and outputting a signal of a detected flow rate of a fluid.

2. Description of the Related Art

In a thermal flow sensor for vehicles, a heating resistor is heated so that the temperature of the heating resistor becomes a predetermined temperature higher than the temperature of a fluid detected by a resistance thermometer for detecting the fluid temperature. The thermal flow sensor is heated by passing a current through the heating resistor so that the temperature of the heating resistor becomes a predetermined temperature higher at all times than the fluid temperature detected by the resistance thermometer. Since the heat quantity transmitted from the surface of the heating resistor surface to the fluid varies according to the flow rate of the fluid flowing on the surface of the heating resistor, the current supplied to the heating resistor is dependent on the flow rate. The flow rate of the fluid can be detected by converting this current into voltage, adjusting it to fall within a desired output characteristic tolerance, and outputting the adjusted voltage. A specific example of this type of the thermal flow sensor is shown in Patent Document 1. An example of another type of the thermal flow sensor is shown in Patent Document 2.

[Patent Document 1] JP-A-2000-314645
[Patent Document 2] JP-A-2005-283381

In the case of automobiles, conventional techniques widely use a system in which the power for the thermal flow sensor is supplied from a battery via a power source terminal.

The supplied power (electric power) is supplied separately to a bridge circuit unit and an integrated circuit unit in the thermal flow sensor. It is necessary to protect the integrated circuit unit so as not to break because of battery line over voltage or superimposed surge. For this purpose, an approach of providing a protection circuit or a regulator in a previous stage of the integrated circuit unit and an approach of increasing the withstanding voltage of the integrated circuit unit have been widely used, which prevent cost reduction and size reduction of the thermal flow sensor.

In the conventional technique shown in Patent Document 2, a constant voltage source (ECU power source) stabilized by a fuel injection control device, in the case of automobiles, may be used as the power source for the thermal flow sensor. However, because the constant voltage stabilized by the fuel injection control device is about 5 V, it is necessary to set the temperature coefficient of resistance of the heating resistor to 1000 ppm/° C. to 2000 ppm/° C., in order to ensure the electric power necessary for heating the heating resistor to a predetermined temperature. This imposes the constraint that the material for the heating resistor is limited.

It is an object of this invention to provide a thermal flow sensor for vehicles that protects the integrated circuit (IC) unit from battery line overvoltage and superimposed surge, without being restricted by the heating resistor with a constrained temperature coefficient of resistance.

SUMMARY OF THE INVENTION

This invention provides a thermal flow sensor for vehicles including: a bridge circuit unit having a heating resistor whose resistance value changes according to temperature and a resistance thermometer whose resistance value changes according to temperature, the resistance thermometer detecting a temperature of a fluid; and an integrated circuit unit controlling the bridge circuit unit and outputting a signal of a detected flow rate of the fluid. In the thermal flow sensor for vehicles, a drive power source for the bridge circuit unit is supplied from a battery, and a drive power source for the integrated circuit unit is supplied from a constant voltage source stabilized by a fuel injection control device.

This invention also provides a thermal flow sensor for vehicles including: a bridge circuit unit having a heating resistor whose resistance value changes according to temperature and a resistance thermometer whose resistance value changes according to temperature, the resistance thermometer detecting a temperature of a fluid, and a temperature of the heating resistor being controlled to be a predetermined temperature higher than that of the resistance thermometer; and an integrated circuit unit controlling the bridge circuit unit, detecting a flow rate of a fluid from an output from the bridge circuit unit based on a resistance change of the heating resistor caused by the fluid flowing on the heating resistor, and outputting a signal of the detected flow rate of the fluid. In the thermal flow sensor for vehicles, a drive power source for the bridge circuit unit is supplied from a battery, and a drive power source for the integrated circuit unit is supplied from a constant voltage source stabilized by a fuel injection control device.

According to the thermal flow sensor for vehicles of this invention, the drive power source for the bridge circuit unit is supplied from a battery, and the drive power source for the integrated circuit unit is supplied from a constant voltage source stabilized by the fuel injection control device. Therefore, the electric power necessary for the heating resistor of the bridge circuit unit can be ensured easily. Also, the integrated circuit unit can be protected from battery line overvoltage and superimposed surge without providing a protection circuit and a regulator for the main unit of the thermal flow sensor for vehicles, or without increasing the withstanding voltage.

The foregoing and other objects, features, aspects and advantages of the present invention will become more apparent from the following detailed description of the present invention when taken in conjunction with the accompanying drawings.

DETAILED DESCRIPTION OF THE INVENTION

First Embodiment

Figure 1:
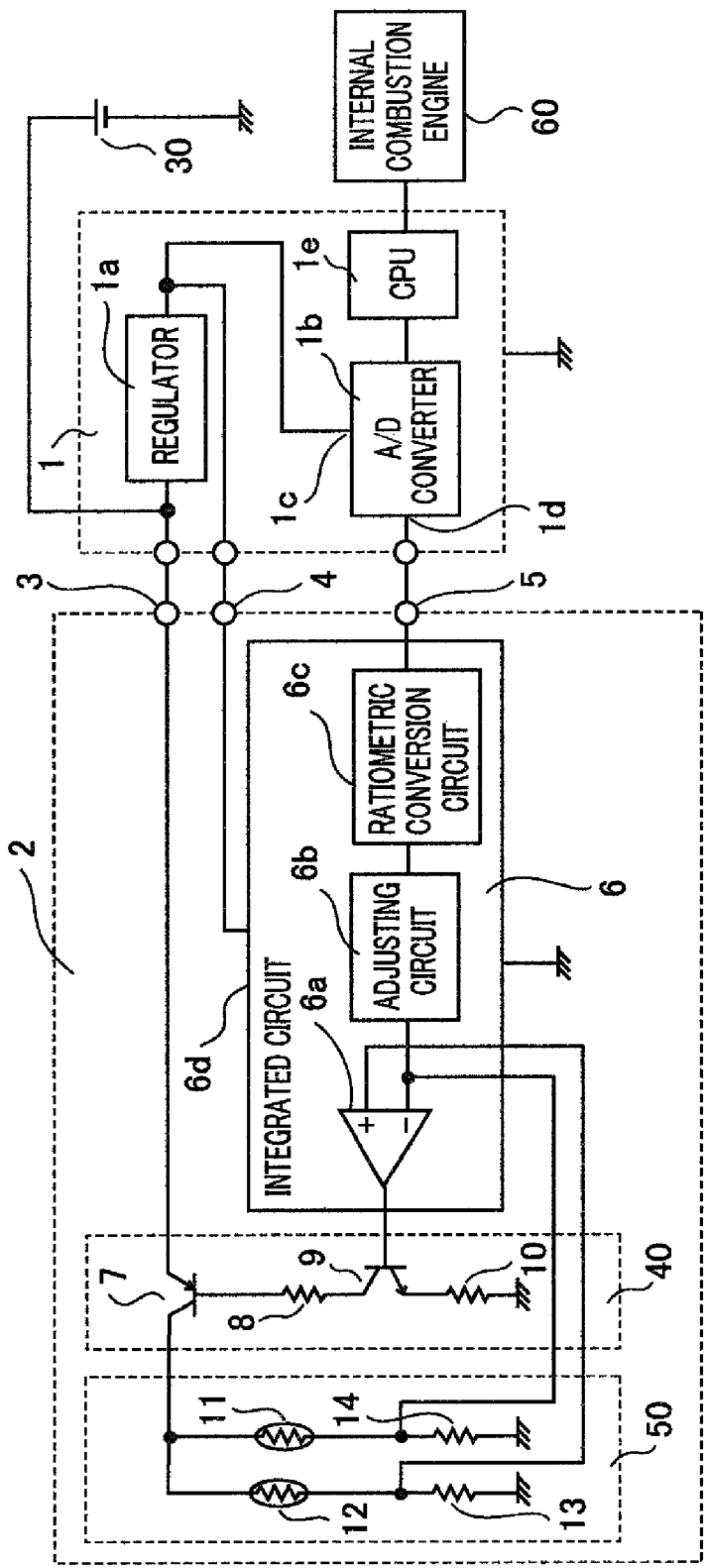
FIG. 1 is a circuit diagram showing a thermal flow sensor for vehicles according to a first embodiment of the invention.

FIG. 1 is a circuit diagram showing a thermal flow sensor for vehicles according to a first embodiment of this invention. The first embodiment pertains to a thermal flow sensor for vehicles used for, for example, an automobile that has a battery and an internal combustion engine controlled by a fuel injection control device. The thermal flow sensor for vehicles is disposed at a combustion air inlet pipe of an engine to measure the flow rate of the inlet air. A fuel injection control device 1 has a regulator 1a. The regulator 1a controls the voltage supplied from a battery 30 so as to be a predetermined voltage at all times, and outputs a constant voltage. A constant voltage source that outputs a predetermined voltage is obtained by the battery 30 and the regulator 1a. The voltage that is output from the regulator 1a (i.e., the voltage of the constant voltage source) is applied to a reference voltage terminal 1c of an A/D converter 1b disposed in the fuel injection control device 1 and to an IC drive power source terminal 4 of a thermal flow sensor 2. The voltage that is output from the regulator 1a (i.e., the voltage of the constant voltage source) serves as a reference voltage of the A/D converter 1b, and it serves as the power source for an integrated circuit unit 6 of the thermal flow sensor 2. The above-mentioned constant voltage source is also referred to an ECU (Engine Control Unit) power source, which is the power source for controlling the fuel injection amount.

The A/D converter 1b A/D-converts a voltage that is input to an input terminal 1d based the reference voltage that is input to the reference voltage terminal 1c. A signal output that is dependent on the flow rate detected by the thermal flow sensor 2 for vehicles is input to a CPU (Central Processing Unit) 1e via the A/D converter 1b. With output signals from other sensors (not shown), the CPU 1e controls fuel injection of an internal combustion engine 60. The voltage supplied to the IC drive power source terminal 4 of the thermal flow sensor 2 (i.e., the voltage of the constant voltage source stabilized by the fuel injection control device 1) is applied to a power source terminal 6d of the integrated circuit unit 6, and is used as a reference voltage for a ratiometric conversion circuit 6c. The constant voltage source stabilized by the fuel injection control device 1 is used as a drive power source for the integrated circuit unit. A bridge circuit 50 includes a heating resistor 11 disposed in the thermal flow sensor 2, a resistance thermometer 12 that is formed at a location that is not affected by the heat from the heating resistor 11 to detect the temperature of a fluid, and resistors 13 and 14 having less resistance value variations by temperature than the resistance thermometer 12.

In the first embodiment, the resistor 14 side terminal of the series circuit of the heating resistor 11 and the resistor 14 is grounded, while the heating resistor 11 side terminal thereof is connected to a power source side terminal. The resistor 13 side terminal of the series circuit of the resistance thermometer 12 and the resistor 13 is grounded, while the resistance thermometer 12 side terminal is connected to a power source side terminal. Both of the power source side terminals are connected to each other. The bridge circuit 50 may have other configurations. The heating resistor 11 and the resistance thermometer 12 are formed of a thermal sensitive resistor material whose resistance value changes according to temperature, such as platinum and nickel. The heating resistor 11 and the resistance thermometer 12 are made of substantially the same material and have substantially the same temperature coefficient of resistance (for example, a positive coefficient of resistance). However, it is not essential that they are made of the same material and they have the same temperature coefficient of resistance.

The bridge circuit 50 is driven by a bridge drive circuit 40 having a transistor 7, a resistor 8, a transistor 9, and a resistor 10. A bridge circuit unit includes the bridge circuit 50 and the bridge drive circuit 40. The power source for the bridge drive circuit 40, as well as the power source for the bridge circuit 50 via the bridge drive circuit 40, that is, the power source for the bridge circuit unit, is supplied from the battery 30 via a power source terminal 3 for the bridge circuit unit. The emitter terminal of the PNP transistor 7 is connected to the power source terminal 3 for the bridge circuit unit, the collector terminal thereof is connected to the power source side terminal of the bridge circuit 50, and the base thereof is grounded via the serial circuit of the resistor 8, the transistor 9, and the resistor 10. There is no problem when the power source for the bridge circuit unit including the bridge circuit 50 and the bridge drive circuit 40 is supplied from the battery directly, because it is easy to employ transistors with high-withstanding voltage for the transistors 7 and 9.

An operational amplifier 6a in the integrated circuit unit 6 is a differential amplifier, and the inverted input terminal (−) thereof is connected to the connection point of the heating resistor 11 and the resistor 14 while the non-inverted input terminal (+) thereof is connected to the connection point of the resistance thermometer 12 and the resistor 13. The output terminal of the operational amplifier 6a and the base of the NPN transistor 9 are connected to each other.

As is known in Patent Document 1, for example, the operational amplifier 6a amplifies the difference (potential difference) between the input terminals (between the inverted input terminal and the non-inverted input terminal), and provides negative feedback, to control the temperature of the heating resistor 11 so as to be a predetermined temperature higher than that of the resistance thermometer 12. Thus, electric current is supplied to the bridge circuit 50 by the bridge drive circuit 40, and the heating resistor 11 is heated. Here, it is assumed that the resistance thermometer 12 and the heating resistor 11 have a positive temperature coefficient of resistance. Next, when the flow rate of the fluid increases, the heat quantity transmitted from the heating resistor 11 to the fluid increases, and therefore, the resistance of the heating resistor 11 tends to become lower. However, the output of the operational amplifier 6a shifts toward the positive side so as to equalize the potential at the connection point between the heating resistor 11 and the resistor 14 and the potential at the connection point between the resistance thermometer 12 and the resistor 13, increasing the current through the transistor 9 and the transistor 7. Accordingly, the current passing through the heating resistor 11 of the bridge circuit 50 increases. When the flow rate of the fluid decreases, the opposite operation to the just-described operation is performed. That is, the current passing through the heating resistor 11 is dependent on the flow rate of the fluid.

The current passing through the heating resistor 11, which is dependent on the flow rate of the fluid, is detected by the voltage generated at the opposite ends of the resistor 14. The detected voltage is adjusted by an adjusting circuit 6b in the integrated circuit unit 6 so as to be within a desired output characteristic tolerance. That is, the output is adjusted so that variations in the output profile (detected flow rate-output signal) that result from, for example, variations in the resistance value and the temperature coefficient of resistance of the resistor and variations in assembling fall within an accuracy (detected flow rate-output signal) that is necessary in using the sensor. The adjusted voltage is converted, by the ratiometric conversion circuit 6c, to a voltage proportional to the voltage of the constant voltage source of the regulator 1a of the fuel injection control device 1, and is output to the A/D converter 1b via an output terminal 5.

By employing the configuration as described above, the electric power necessary for the heating resistor can be ensured easily without being restricted to the heating resistor with a constrained temperature coefficient of resistance, because the drive power source for the bridge circuit unit is supplied from the battery. Moreover, because the drive power source for the integrated circuit unit is supplied from the constant voltage source stabilized by the fuel injection control device, the integrated circuit unit can be protected from the battery line overvoltage and superimposed surge without providing a protection circuit or a regulator for the main unit of the thermal flow sensor for vehicles. Also, the withstanding voltage of the integrated circuit (IC) unit need not be increased. As a result, a low-cost and small-sized thermal flow sensor for vehicles can be obtained.

Furthermore, in a thermal flow sensor that generates what is called ratiometric output, in which the voltage of the constant voltage source used for the A/D converter 1b of the fuel injection control device 1 is input to the integrated circuit unit 6 in the thermal flow sensor 2 and a sensor voltage or current proportional to the voltage value of the constant voltage source is output, the first embodiment can be achieved without additionally providing the connector terminal and harness for connecting the thermal flow sensor 2 and the fuel injection control device 1 to each other by using the IC drive power source terminal 4 for driving the integrated circuit unit 6 also as the terminal for inputting the reference voltage. What is more, since a current of several milliamperes to about a dozen milliamperes for driving the integrated circuit unit 6 passes through the IC drive power source terminal 4, it becomes possible to eliminate the gold plating for preventing oxidation of the drive power source terminal 4 and the pull-down resistor for ensuring the terminal current to be 1 mA or higher.

Second Embodiment

Figure 2:
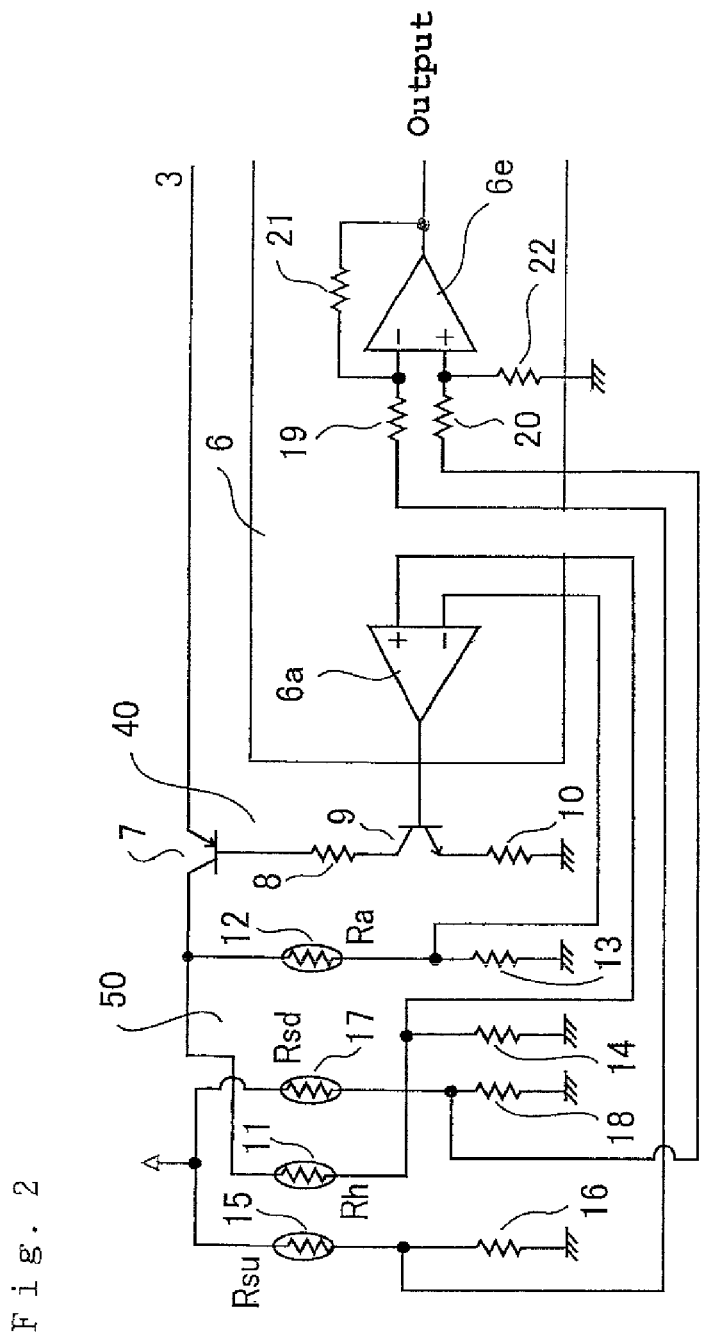
FIG. 2 is a circuit diagram showing a primary portion of a thermal flow sensor for vehicles according to a second embodiment.

The thermal flow sensor for vehicles causes a resistor whose resistance value changes according to temperature to produce heat, and there are plural types of thermal flow sensors for vehicles that use a bridge circuit unit having a heating resistor and an integrated circuit unit. This invention is applicable to any of the types. FIG. 2 is a circuit diagram showing a primary portion of a thermal flow sensor for vehicles according to a second embodiment. In the drawings, the same reference symbols refer to the same or corresponding parts, and the description thereof is partially omitted. Reference numeral 11 denotes a heating resistor Rh, and reference numeral 12 denotes a resistance thermometer Ra (for detecting a fluid temperature). Reference numeral 15 denotes a resistance thermometer Rsu (on the upstream side of the heating resistor), and reference numeral 17 denotes a resistance thermometer Rsd (on the downstream side of the heating resistor). The resistance values of the resistance thermometers 15 and 17 change according to temperature. It is desirable that the resistance thermometers 15 and 17 have the same (for example, positive) temperature coefficient of resistance. Reference numerals 16 and 18 denote fixed resistors whose resistance value variations according to temperature are smaller than those of the resistance thermometers 15 and 17. The power source terminals of the resistance thermometers 15 and 17 are connected to the constant voltage source (the constant voltage source of the first embodiment), but the electric power required by the resistance thermometers 15 and 17 is lower than the electric power of the bridge circuit units 50 and 40. By equalizing the voltage of the constant voltage source applied to the resistance thermometers 15 and 17 and the voltage of the constant voltage source used for the A/D converter 1b (FIG. 1), it is possible to generate what is called a ratiometric output, an output of a sensor voltage or current proportional to the voltage of the constant voltage source.

An operational amplifier 6e in the integrated circuit unit 6 is a differential amplifier. The connection point of the resistance thermometer 15 and the resistor 16 is connected to the inverted input terminal (−) thereof via a resistor 19, and the output terminal of the operational amplifier 6e is connected to the inverted input terminal (−) thereof via a resistor 21. The voltage at the connection point between the resistance thermometer 17 and the resistor 18 is divided by the resistor 20 and the resistor 22, and the connection point of the resistor 20 and the resistor 22 is connected to the non-inverted input terminal (+). The output terminal of the operational amplifier 6e is connected to the adjusting circuit 6b (FIG. 1). In addition to the bridge circuit 50 and the bridge drive circuit 40 shown in FIG. 1, the resistance thermometer 15 is provided on the upstream side of the heating resistor 11 and the resistance thermometer 17 is provided on the downstream side. The bridge circuit unit includes the bridge drive circuit 40 and the bridge circuit 50. As in the first embodiment, the operational amplifier 6a amplifies the difference (potential difference) between the input terminals (between the inverted input terminal and the non-inverted input terminal), provides negative feedback, to control the temperature of the heating resistor 11 so as to be a predetermined temperature higher than that of the resistance thermometer 12. Thus, electric current is supplied to the bridge circuit 50 by the bridge drive circuit 40, and heating resistor 11 is heated.

When the flow of the fluid is in a forward direction, the resistance thermometer 15 (Rsu) positioned on the upstream side is cooled more easily than the resistance thermometer 17 (Rsd) positioned on the downstream side, and therefore, the temperature of the resistance thermometer 15 (Rsu) is made lower than the temperature of the resistance thermometer 17 (Rsd) by the flow rate of the fluid. By detecting the temperature difference between the resistance thermometer 15 (Rsu) and the resistance thermometer 17 (Rsd) based on the changed resistance values Rsu and Rsd, a flow rate signal is output to the output terminal of the operational amplifier 6e. In this way, the flow rate signal of the thermal flow sensor for vehicles can be output.

In the thermal flow sensor for vehicles according to the second embodiment as well, the drive power source for the bridge circuit unit is supplied from the battery, and the drive power source for the integrated circuit unit is supplied from the constant voltage source stabilized by the fuel injection control device. Therefore, the electric power necessary for the heating resistor of the bridge circuit unit can be ensured easily. Also, the integrated circuit unit can be protected from battery line overvoltage and superimposed surge without providing a protection circuit and a regulator for the main unit of the thermal flow sensor for vehicles, or without increasing the withstanding voltage.

Another type of thermal flow sensor for vehicles includes a type in which two sets of heating resistors and resistance thermometers are provided to detect the difference in heating current between them.

Still another type of thermal flow sensor for vehicles includes a type employing a bridge circuit having a resistance thermometer for detecting the temperature of the heating resistor, a resistance thermometer for detecting the temperature of a fluid, and a heating resistor, to control the current passing through the heating resistor so that the temperature of the heating resistor becomes a predetermined temperature higher than the temperature of the resistance thermometer for detecting the temperature of the fluid.

Various modifications and alterations of this invention will be apparent to those skilled in the art without departing from the scope and spirit of this invention, and it should be understood that this invention is not limited to the illustrative embodiments set forth herein.

What is claimed is:

1. A thermal flow sensor for vehicles comprising:
a bridge circuit unit having a heating resistor whose resistance value changes according to temperature and a resistance thermometer whose resistance value changes according to temperature, the resistance thermometer detecting a temperature of a fluid;
a control circuit unit controlling the bridge circuit unit and outputting a signal of a detected flow rate of the fluid; and
an analog/digital converter receiving the signal of the detected flow rate from the control circuit unit, wherein:
a drive power source for the bridge circuit unit is supplied from a battery; and
a drive power source for the control circuit unit is supplied from a constant voltage source stabilized by a fuel injection control device to protect the control circuit from overvoltage or a surge in voltage.

2. The thermal flow sensor for vehicles according to claim 1, wherein the drive power source for the control circuit unit is supplied from a constant voltage source stabilized by a fuel injection control device, and a voltage of the constant voltage source is proportional to a reference voltage supplied to an A/D converter of the fuel injection control device.

3. The thermal flow sensor for vehicles according to claim 2, wherein a voltage of the drive power source for the control circuit unit is set to a reference voltage of the control circuit unit, and a flow rate output adjusted to be within a desired output characteristic tolerance by the control circuit unit has a ratiometric characteristic proportional to the reference voltage of the control circuit unit.

4. The thermal flow sensor for vehicles according to claim 1, wherein a voltage of the drive power source for the control circuit unit is set to a reference voltage of the control circuit unit, and a flow rate output adjusted to be within a desired output characteristic tolerance by the control circuit unit has a ratiometric characteristic proportional to the reference voltage of the control circuit unit.

5. A thermal flow sensor for vehicles comprising:
a bridge circuit unit having a heating resistor whose resistance value changes according to temperature, and a resistance thermometer whose resistance value changes according to temperature, the resistance thermometer detecting a temperature of a fluid, and a temperature of the heating resistor being controlled to be a predetermined temperature higher than that of the resistance thermometer;
a control circuit unit controlling the bridge circuit unit, detecting a flow rate of a fluid from an output from the bridge circuit unit based on a resistance change of the heating resistor caused by the fluid flowing on the heating resistor, and outputting a signal of the detected flow rate of the fluid; and
an analog/digital converter receiving the signal of the detected flow rate from the control circuit unit, wherein:
a drive power source for the bridge circuit unit is supplied from a battery; and
a drive power source for the control circuit unit is supplied from a constant voltage source stabilized by a fuel injection control device.

6. The thermal flow sensor for vehicles according to claim 5, wherein the drive power source for the control circuit unit is supplied from a constant voltage source stabilized by a fuel injection control device, and a voltage of the constant voltage source is proportional to a reference voltage supplied to an A/D converter of the fuel injection control device.

7. The thermal flow sensor for vehicles according to claim 2, wherein a voltage of the drive power source for the control circuit unit is set to a reference voltage of the control circuit unit, and a flow rate output adjusted to be within a desired output characteristic tolerance by the control circuit unit has a ratiometric characteristic proportional to the reference voltage of the control circuit unit.

* * * * *